United States Patent
Sugawara et al.

(10) Patent No.: US 11,876,216 B2
(45) Date of Patent: Jan. 16, 2024

(54) ELECTRODE MIXTURE, BATTERY, AND METHOD FOR PRODUCING ELECTRODE

(71) Applicant: Panasonic Intellectual Property Management Co., Ltd., Osaka (JP)

(72) Inventors: Ryo Sugawara, Hyogo (JP); Takashi Kouzaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 35 days.

(21) Appl. No.: 17/744,202

(22) Filed: May 13, 2022

(65) Prior Publication Data

US 2022/0278313 A1 Sep. 1, 2022

Related U.S. Application Data

(63) Continuation of application No. 16/245,386, filed on Jan. 11, 2019, now abandoned.

(30) Foreign Application Priority Data

Jan. 31, 2018 (JP) ................................ 2018-015192

(51) Int. Cl.

| | |
|---|---|
| *H01M 4/36* | (2006.01) |
| *H01M 4/04* | (2006.01) |
| *H01M 4/131* | (2010.01) |
| *H01M 4/139* | (2010.01) |
| *H01M 4/62* | (2006.01) |
| *H01M 10/0525* | (2010.01) |
| *H01M 10/0562* | (2010.01) |
| *H01M 4/1391* | (2010.01) |
| *H01M 4/13* | (2010.01) |
| *H01M 4/525* | (2010.01) |
| *H01M 10/052* | (2010.01) |

(52) U.S. Cl.
CPC ......... *H01M 4/364* (2013.01); *H01M 4/0404* (2013.01); *H01M 4/0409* (2013.01); *H01M 4/13* (2013.01); *H01M 4/131* (2013.01); *H01M 4/139* (2013.01); *H01M 4/1391* (2013.01); *H01M 4/366* (2013.01); *H01M 4/525* (2013.01); *H01M 4/621* (2013.01); *H01M 4/622* (2013.01); *H01M 10/0525* (2013.01); *H01M 10/0562* (2013.01); *H01M 10/052* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 5,707,756 A | 1/1998 | Inoue et al. | |
| 9,337,509 B2 * | 5/2016 | Kato | H01B 1/122 |
| 2012/0231349 A1 | 9/2012 | Moon et al. | |
| 2013/0157143 A1 | 6/2013 | Hoshiba et al. | |
| 2014/0093771 A1 | 4/2014 | Wang et al. | |
| 2015/0030928 A1 | 1/2015 | Kwak et al. | |
| 2016/0028107 A1 | 1/2016 | Kubo et al. | |
| 2017/0098864 A1 | 4/2017 | Ebisuzaki et al. | |
| 2017/0301949 A1 | 10/2017 | Mimura et al. | |
| 2018/0076481 A1 | 3/2018 | Makino et al. | |
| 2019/0207249 A1 | 7/2019 | Nakanishi et al. | |

FOREIGN PATENT DOCUMENTS

| | | |
|---|---|---|
| JP | 2009-176484 | 8/2009 |
| JP | 2015-002053 A | 1/2015 |
| JP | 2015-018712 | 1/2015 |
| JP | 2015-041556 A | 3/2015 |
| JP | 2016-025027 | 2/2016 |
| WO | 2016/129426 A1 | 8/2016 |
| WO | 2016/190304 A1 | 12/2016 |

OTHER PUBLICATIONS

The Extended European Search Report dated Mar. 6, 2019 for the related European Patent Application No. 19154140.8.
Communication pursuant to Article 94(3) EPC dated May 15, 2020 for the related European Patent Application No. 19154140.8.
Non-Final Office Action dated Jan. 26, 2021 issued in U.S. Appl. No. 16/245,386.
Final Office Action dated Jul. 30, 2021 issued in U.S. Appl. No. 16/245,386.
Non-Final Office Action dated Oct. 28, 2021 issued in U.S. Appl. No. 16/245,386.
Final Office Action dated Mar. 11, 2022 issued in U.S. Appl. No. 16/245,386.

\* cited by examiner

*Primary Examiner* — Tanisha Diggs
(74) *Attorney, Agent, or Firm* — Rimon P.C.

(57) ABSTRACT

An electrode mixture includes a sulfide solid electrolyte and a carbon-containing material having contact with the sulfide solid electrolyte. An intensity ratio C/S determined from a spectrum obtained by analyzing the electrode mixture by Auger electron spectroscopy satisfies $0.2 \leq C/S \leq 1$, where C is an intensity of a peak in the spectrum which corresponds to carbon included in the carbon-containing material, and S is an intensity of a peak in the spectrum which corresponds to sulfur included in the sulfide solid electrolyte.

6 Claims, 6 Drawing Sheets

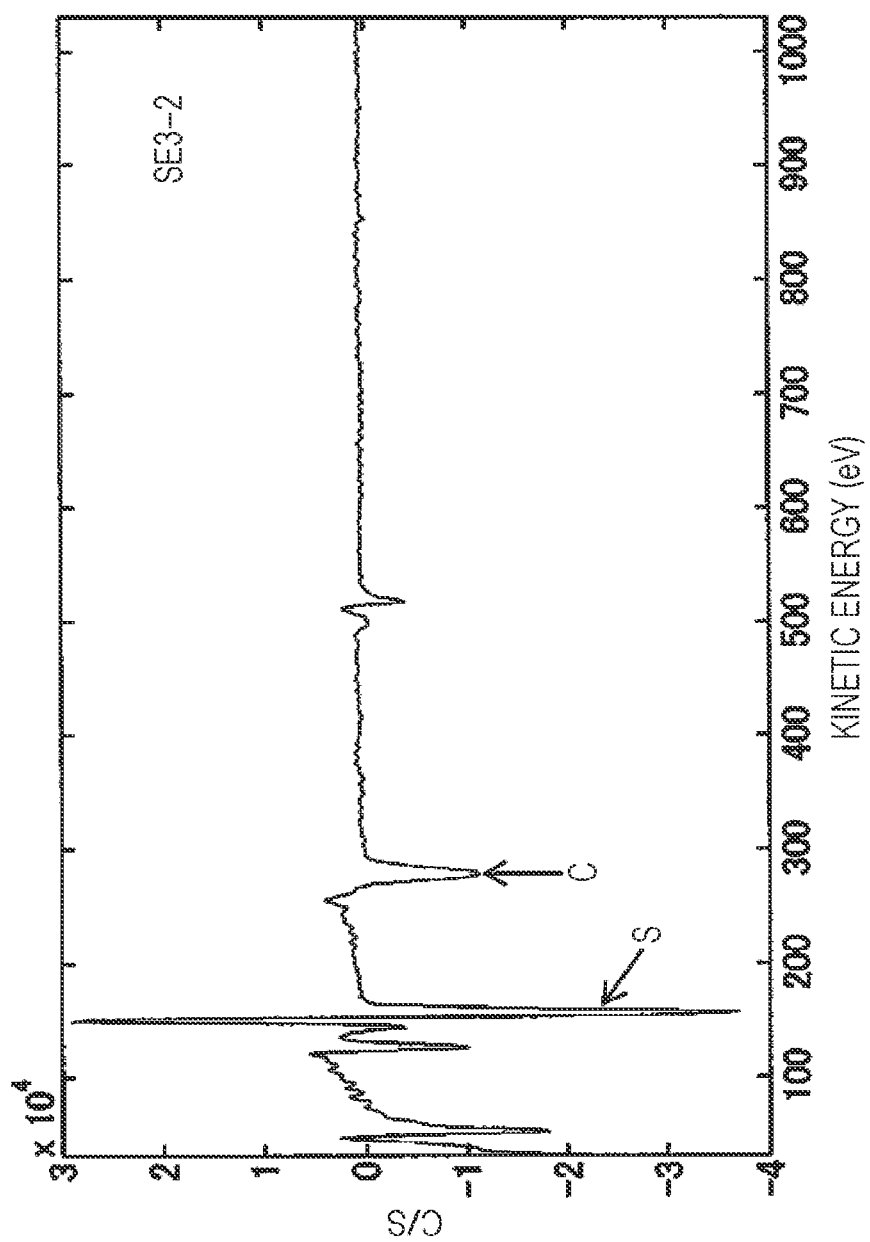

ELECTRODE MIXTURE, BATTERY, AND METHOD FOR PRODUCING ELECTRODE

CROSS-REFERENCE OF RELATED APPLICATIONS

This application is a Continuation of U.S. patent application Ser. No. 16/245,386, filed on Jan. 11, 2019, which claims the benefit of Japanese Patent Application No. 2018-015192, filed on Jan. 31, 2018, the entire disclosures of which Applications are incorporated by reference herein.

BACKGROUND

1. Technical Field

The present disclosure relates to an electrode mixture, a battery, and a method for producing an electrode.

2. Description of the Related Art

With reductions in the weights of electronic devices, such as personal computers and mobile phones, and the widespread proliferation of cordless electronic devices, further development of rechargeable batteries, that is, secondary batteries, has been anticipated. Examples of secondary batteries include a nickel-cadmium battery, a nickel-hydrogen battery, a lead-acid battery, and a lithium ion battery. Attention has been focused on lithium ion batteries, which are light in weight and have a high voltage and a high energy density.

In the field of automobiles, such as electric vehicles and hybrid vehicles, prime importance has been placed on the development of high-capacity secondary batteries, and the demand for lithium ion batteries is increasing.

SUMMARY

There has been a demand for batteries having a further high charge-discharge efficiency.

In one general aspect, the techniques disclosed here feature an electrode mixture including a sulfide solid electrolyte and a carbon-containing material having contact with the sulfide solid electrolyte. An intensity ratio C/S determined from a spectrum obtained by analyzing the electrode mixture by Auger electron spectroscopy satisfies $0.2 \leq C/S \leq 1$, where C is an intensity of a first peak in the spectrum, the first peak corresponding to carbon included in the carbon-containing material, and S is an intensity of a second peak in the spectrum, the second peak corresponding to sulfur included in the sulfide solid electrolyte.

The electrode mixture according to the present disclosure may increase the charge-discharge efficiency of a battery.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4B is an Auger electron spectrum measured at the point SE3-2 shown in FIG. 3.

DETAILED DESCRIPTION

Figure 1:
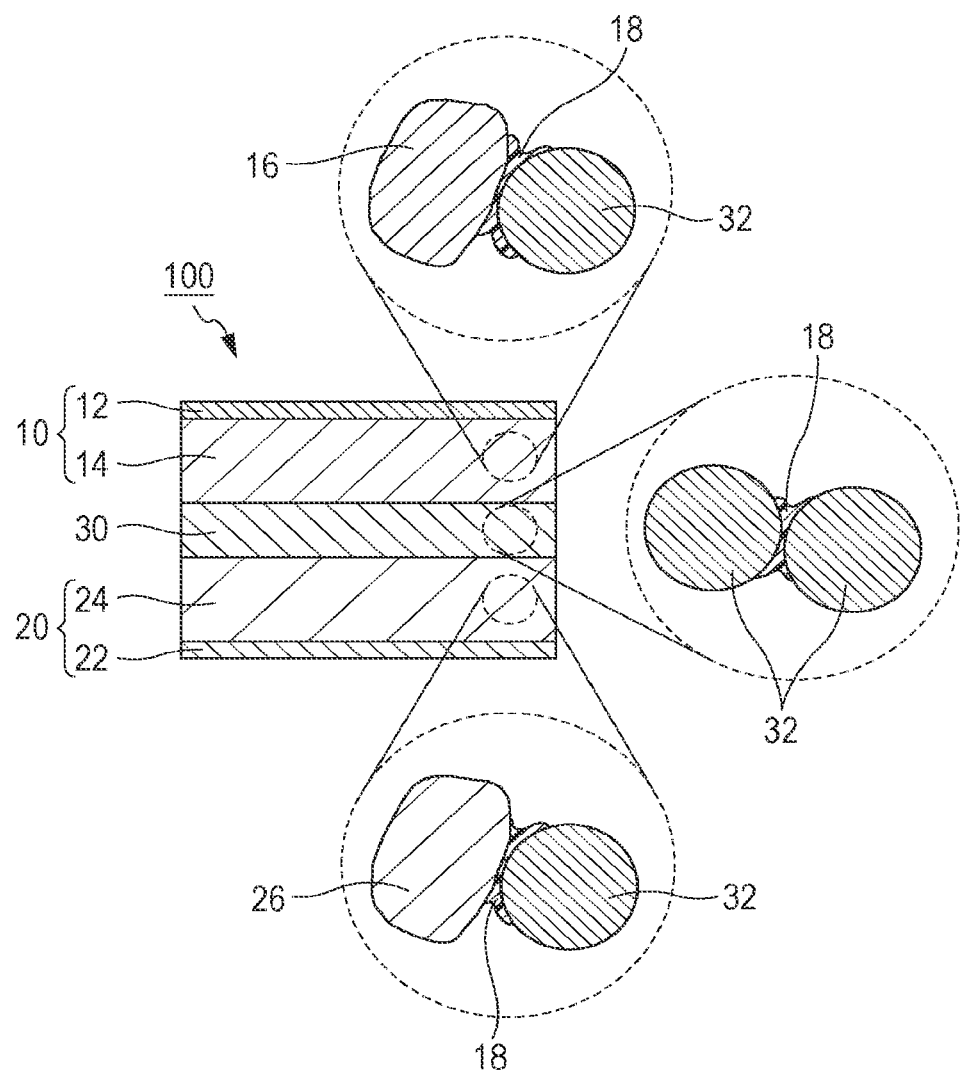
FIG. 1 is a cross-sectional view of a battery according to an embodiment of the present disclosure.

Underlying Knowledge Forming Basis of the Present Disclosure

A lithium secondary battery includes a positive electrode, a negative electrode, and an electrolyte layer interposed therebetween. The electrolyte layer includes a nonaqueous electrolyte solution or a solid electrolyte. Since commonly used electrolyte solutions are combustible, lithium secondary batteries that include an electrolyte solution need to include a safety system. In contrast, since solid electrolytes are incombustible, the above system can be simplified in a lithium secondary battery that includes a solid electrolyte. Batteries that include a solid electrolyte are referred to as "all-solid-state batteries".

Solid electrolytes are broadly divided into organic solid electrolytes and inorganic solid electrolytes. It is difficult to operate an all-solid-state battery that includes an organic solid electrolyte at room temperature because the ionic conductivity of organic solid electrolytes at room temperature is about $10^{-6}$ S/cm. Examples of inorganic solid electrolytes include an oxide solid electrolyte and a sulfide solid electrolyte, which have an ionic conductivity of $10^{-3}$ to $10^{-4}$ S/cm.

Oxide solid electrolytes disadvantageously have high grain-boundary resistance. There have been attempts to reduce the grain-boundary resistance by sintering material powders and reducing the thickness of a battery. Sintering of the material powders needs to be performed at a high temperature. Performing the sintering treatment at a high temperature induces interdiffusion between the elements constituting a positive or negative electrode and the elements constituting the solid electrolyte and, consequently, makes it difficult to achieve suitable charge-discharge characteristics. Accordingly, in the case where an oxide solid electrolyte is used, commonly, an attempt has been made to reduce the thickness of a battery. However, it is not easy to increase the size of such a thin-film all-solid-state battery. Moreover, it is difficult to increase the capacity of such a thin-film all-solid-state battery.

Sulfide solid electrolytes have lower grain-boundary resistance than oxide solid electrolytes. In the case where an all-solid-state battery is produced using a sulfide solid electrolyte, it is not necessary to sinter material powders and suitable properties can be achieved by compression molding of the material powders. In order to increase the size and capacity of all-solid-state batteries, there is active research and development of a technique in which an all-solid-state battery that includes a sulfide solid electrolyte is produced by a coating method. In the technique in which an all-solid-state battery is produced by a coating method, positive and negative electrodes and an electrolyte layer may be produced by a coating method. The positive electrode is produced by forming a positive electrode mixture layer that includes a positive electrode active material, a solid electrolyte, and a resin material on a positive electrode current collector. The negative electrode is produced by forming a negative electrode mixture layer that includes a negative electrode active material, a solid electrolyte, and a resin material on a negative electrode current collector. The solid electrolyte layer includes a solid electrolyte and a resin material and is interposed between the positive and negative electrodes. In the coating method, for example, a slurry that includes the above materials and a solvent is applied to a current collector to form a coating film on the current collector and the coating film is dried to form an intended layer.

The resin material is necessary for increasing the adhesion between particles constituting each of the above layers and the adhesion between each of the above layers and a corresponding one of the current collectors. However, the resin material may degrade the properties of a battery because the resin material has a significantly low ionic conductivity. In addition, the solid electrolyte is likely to become degraded when reacted with the solvent or the resin material. There have been proposed various resin materials as described in Japanese Unexamined Patent Application Publication No. 2016-25027, Japanese Unexamined Patent Application Publication No. 2015-18712, and Japanese Unexamined Patent Application Publication No. 2009-176484 (hereinafter, referred to as "PTL 1", "PTL 2", and "PTL 3", respectively).

PTL 1 and PTL 2 disclose that poly(vinylidene fluoride) (PVDF) and poly(vinylidene fluoride-co-hexafluoropropylene) (PVDF-HFP) may be used as a binder. PTL 3 discloses that a thermoplastic elastomer and a resin that includes an ethylene oxide skeleton may be used as a binder.

However, since the adhesion of PVDF and the adhesion of PVDF-HFP are low, in the case where PVDF and PVDF-HFP are used as a binder, it is necessary to increase the amount of binder for increasing the adhesion between the particles to a sufficient level. A significant increase in the amount of binder leads to degradation in the properties of a battery. A thermoplastic elastomer and a resin including an ethylene oxide skeleton are binders that are more capable of increasing the adhesion than PVDF and PVDF-HFP. However, in PTL 3, only the content of a binder is specified and no mention is made of the manner in which the binder is dispersed.

For example, when an active material is mixed with a solid electrolyte, the solid electrolyte is likely to form aggregates. The aggregation of the solid electrolyte results in degradation in the dispersibility of the active material and a binder in an electrode mixture. As a result, the adhesion between the particles of materials is reduced and, accordingly, the properties of a battery may become degraded. Thus, the dispersibility of a binder in an electrode mixture is important. However, it cannot be said that how the binder is to be dispersed for producing a battery having suitable properties is clear. It is difficult to disperse a binder in an electrode mixture in an ideal manner.

For increasing both discharge capacity and coulombic efficiency (i.e., discharge capacity/charge capacity), it is necessary to accurately and quantitatively determine the manner in which a binder is present in an electrode mixture.

Binders included in lithium secondary batteries are commonly materials impermeable to both lithium ions and electrons. In other words, the binders do not have either ionic conductivity or electron conductivity. Accordingly, it is ideal that the least amount of binder required to absorb expansion and contraction of the particles constituting a battery (hereinafter, referred to as "constituent particles") be deposited on the surfaces of the constituent particles. It is also ideal that the binder be not present at the points at which the constituent particles come into contact with one another (hereinafter, such points are referred to as "contact points") but only in the vicinity of the contact points. In such a case, the constituent particles can be fixed to one another without degrading the electron conductivity and ionic conductivity between the constituent particles. However, it is difficult to achieve the above ideal state by the methods for producing an electrode which have been proposed in the related art; the development of a novel production method has been anticipated.

The present disclosure was made in light of the above issues and provides a technique for achieving both high adhesion between the constituent particles and suitable properties of a battery.

For producing an electrode mixture capable of increasing the charge-discharge efficiency of a battery, it is necessary to appropriately control the manner in which a binder is present in the electrode mixture. In other words, it is desirable to control the manner in which a carbon-containing material is present on the surfaces of particles of a sulfide solid electrolyte included in the electrode mixture to be within an appropriate range. In this regard, Auger electron spectroscopy, which enables i) acquisition of information about only the surfaces of particles, ii) reduction in the size of the region that is to be measured (i.e., high surface resolution), and iii) measurement of Li, was used for analyzing an electrode mixture. This enabled an accurate analysis of information about a carbon-containing material present on the surfaces of particles of a sulfide solid electrolyte. Thus, the present disclosure was made. Specifically, when a specimen is analyzed by Auger electron spectroscopy, an electron beam is impinged on the specimen, from which Auger electrons are generated. Since Auger electrons have a significantly short mean free path, only the Auger electrons generated from atoms located in the vicinity of the surface of the specimen can be emitted from the specimen without losing energy and detected. According to the above features of Auger electron spectroscopy, an Auger electron spectrum is considered to include information about a carbon-containing material present on the surfaces of particles of a sulfide solid electrolyte. The ratio C/S of the carbon peak intensity C to the sulfur peak intensity S reflects the content of the carbon-containing material present on the surfaces of particles of the sulfide solid electrolyte.

Outline of Aspects of the Present Disclosure

An electrode mixture according to a first aspect of the present disclosure includes:
- a sulfide solid electrolyte; and
- a carbon-containing material having contact with the sulfide solid electrolyte,
- wherein an intensity ratio C/S determined from a spectrum obtained by analyzing the electrode mixture by Auger electron spectroscopy satisfies $0.2 \leq C/S \leq 1$, where C is an intensity of a first peak in the spectrum, the first peak corresponding to carbon included in the carbon-containing material, and S is an intensity of a second peak in the spectrum, the second peak corresponding to sulfur included in the sulfide solid electrolyte.

The electrode mixture according to the first aspect may increase the charge-discharge efficiency of a battery.

According to a second aspect of the present disclosure, for example, the carbon-containing material included in the electrode mixture according to the first aspect is a binder. In the electrode mixture according to the second aspect, the carbon-containing material may reduce the degradation of an electrode caused as a result of contraction and expansion of particles of an active material.

A battery according to a third aspect of the present disclosure includes the electrode mixture according to the first or second aspect. The battery according to the third aspect may have a high charge-discharge efficiency.

According to a fourth aspect of the present disclosure, for example, the battery according to the third aspect further includes a positive electrode and the positive electrode includes the electrode mixture. When the carbon-containing material is included in a positive electrode, particles of a positive electrode active material and particles of the solid electrolyte may be dispersed uniformly in the positive electrode. In addition, the adhesion between the above particles may be increased.

A method for producing an electrode according to a fifth aspect of the present disclosure includes:

preparing a slurry including a sulfide solid electrolyte, an electrode active material, a carbon-containing material, and a solvent;

applying the slurry to a current collector to form a coating film on the current collector; and removing the solvent from the coating film to form an electrode mixture layer, wherein an intensity ratio C/S determined from a spectrum obtained by analyzing the electrode mixture layer by Auger electron spectroscopy satisfies $0.2 \leq C/S \leq 1$, where C is an intensity of a first peak in the spectrum, the first peak corresponding to carbon included in the carbon-containing material, and S is an intensity of a second peak in the spectrum, the second peak corresponding to sulfur included in the sulfide solid electrolyte.

The production method according to the fifth aspect may enable the production of an electrode capable of increasing the charge-discharge efficiency of a battery.

According to a sixth aspect of the present disclosure, for example, in the method for producing an electrode according to the fifth aspect, the slurry is prepared by stirring a first mixture including the sulfide solid electrolyte, the carbon-containing material, and the solvent, adding the electrode active material to the first mixture to prepare a second mixture, and stirring the second mixture. In the production method according to the sixth aspect, a first mixture including a solid electrolyte, a carbon-containing material, and a solvent is prepared, the first mixture is stirred, and an electrode active material is subsequently added to the first mixture to prepare a second mixture. In other words, a solid electrolyte, which is likely to form aggregates, is dispersed in a solvent first, and an electrode active material is subsequently dispersed in the solvent. This method enables the solid electrolyte to be dispersed in the solvent with certainty and increases the adhesion between the particles of the above materials to a sufficient degree. As a result, a battery having suitable properties may be produced.

Embodiments of the Present Disclosure

Embodiments of the present disclosure are described below with reference to the attached drawings. In the following embodiments, general or specific examples are described. All the values, shapes, materials, components, the arrangement and positions of the components, and the connection between the components, steps, and the like described in the following embodiments are for illustrative purposes only and are not intended to limit the scope of the present disclosure.

FIG. 1 is a cross-sectional view of a battery according to an embodiment of the present disclosure. A battery 100 includes a positive electrode 10, a negative electrode 20, and an electrolyte layer 30. The electrolyte layer 30 is interposed between the positive electrode 10 and the negative electrode 20. That is, the positive electrode 10, the electrolyte layer 30, and negative electrode 20 are stacked on top of one another in this order. The positive electrode 10 includes a positive electrode current collector 12 and a positive electrode mixture layer 14. The positive electrode mixture layer 14 is disposed on the positive electrode current collector 12. The negative electrode 20 includes a negative electrode current collector 22 and a negative electrode mixture layer 24. The negative electrode mixture layer 24 is disposed on the negative electrode current collector 22. The electrolyte layer 30 is interposed between the positive electrode mixture layer 14 and the negative electrode mixture layer 24. The electrolyte layer 30 is having contact with the positive electrode mixture layer 14 and the negative electrode mixture layer 24. The electrolyte layer 30 may include a solid electrolyte or a liquid electrolyte. When all the electrolytes included in the battery 100 are solid electrolytes, the battery 100 may be referred to as "all-solid-state battery". At least one component selected from the group consisting of the positive electrode 10, the negative electrode 20, and the electrolyte layer 30 includes a carbon-containing material 18. In this embodiment, all of the positive electrode 10, the negative electrode 20, and the electrolyte layer 30 include the carbon-containing material 18.

1. Current Collector

The positive and negative electrode current collectors 12 and 22 are composed of a material having electron conductivity. The material used for producing the positive electrode current collector 12 may be the same as or different from the material used for producing the negative electrode current collector 22. Examples of the material having electron conductivity include a metal, carbon, and a conductive resin. Examples of the metal include copper, stainless steel, aluminum, nickel, titanium, lithium, and indium. The positive and negative electrode current collectors 12 and 22 are typically composed of copper or a copper alloy. The shapes of the positive and negative electrode current collectors 12 and 22 are not limited; the positive and negative electrode current collectors 12 and 22 may be foil-like or mesh-like.

2. Positive Electrode Mixture Layer (Electrode Mixture Layer)

The positive electrode mixture layer 14 includes a positive electrode active material 16, a carbon-containing material 18, and a solid electrolyte 32. The positive electrode active material 16 and the solid electrolyte 32 are particulate. A particle of the positive electrode active material 16 and a particle of the solid electrolyte 32 are bonded to each other with the carbon-containing material 18. Although not illustrated in FIG. 1, the carbon-containing material 18 also forms a bond between particles of the positive electrode active material 16 and the positive electrode current collector 12, between particles of the solid electrolyte 32 and the positive electrode current collector 12, between particles of the positive electrode active material 16, and between particles of the solid electrolyte 32. In other words, in the positive electrode 10, the carbon-containing material 18 may be present between particles of the positive electrode active material 16 and the positive electrode current collector 12, between particles of the solid electrolyte 32 and the positive electrode current collector 12, between particles of the positive electrode active material 16, and between particles of the solid electrolyte 32.

When the positive electrode mixture layer 14 includes the carbon-containing material 18, particles of the positive electrode active material 16 and particles of the solid electrolyte 32 may be dispersed uniformly in the positive electrode mixture layer 14. In addition, the adhesion between the particles of the above components may be increased.

The carbon-containing material 18 serves, for example, as a binder. Specifically, the carbon-containing material 18 may reduce the degradation of the positive electrode 10 caused as a result of contraction or expansion of particles of the positive electrode active material 16. In the positive electrode mixture layer 14, the carbon-containing material 18 may form at least one bond selected from a bond between particles of the positive electrode active material 16 and the positive electrode current collector 12, a bond between particles of the solid electrolyte 32 and the positive electrode current collector 12, a bond between particles of the positive electrode active material 16, and a bond between particles of the solid electrolyte 32.

(a) Positive Electrode Active Material

Examples of the positive electrode active material 16 include a lithium transition metal oxide and a lithium transition metal phosphate. Examples of the lithium transition metal oxide include $LiCoO_2$, $LiNiO_2$, and $LiMn_2O_4$. Examples of the lithium transition metal phosphate include $LiCoPO_4$, $LiNiPO_4$, $LiFePO_4$, and $LiMnPO_4$. Compounds produced by replacing the transition metal included in the above compounds with one or more foreign elements may also be used as a positive electrode active material 16. Specific examples of such compounds that can be used as a positive electrode active material 16 include $LiNi_{1/3}Co_{1/3}Mn_{1/3}O_2$, $LiNi_{0.08}Co_{0.15}Al_{0.05}O_2$, and $LiNi_{0.05}Mn_{1.5}O_2$. The surfaces of particles of the positive electrode active material 16 may be coated with an oxide solid electrolyte in order to improve the rate characteristics. Examples of the oxide solid electrolyte include $LiNbO_3$.

The average diameter of particles of the positive electrode active material 16 is not limited and may be, for example, 2 to 20 μm. The term "average diameter" used herein refers to the average diameter of particles calculated by the following method. A group of particles are observed with an electron microscope. The area of a specific one of the particles in an image taken with the electron microscope is determined by image processing. In the case where only the group of particles cannot be observed directly, a structure that includes the particles is observed with an electron microscope, and the area of the specific one of the particles in an image taken with the electron microscope is determined by image processing. The diameter of a circle having an area equal to the area of the specific particle is considered to be the diameter of the specific particle. The diameters of a certain number (e.g., ten) of particles are calculated and the average thereof is considered to be the average diameter of the particles.

(b) Solid Electrolyte

The solid electrolyte 32 may be a sulfide solid electrolyte or an oxide solid electrolyte. In this embodiment, at least one layer selected from the positive electrode mixture layer 14 and the negative electrode mixture layer 24 may include a sulfide solid electrolyte. A layer other than the mixture layer that includes a sulfide solid electrolyte may include a solid electrolyte other than a sulfide solid electrolyte.

Examples of the sulfide solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. A sulfide solid electrolyte including Li, P, and S has a high lithium ion conductivity and is relatively flexible. In the case where the solid electrolyte has an appropriate flexibility, the area of the interfaces between particles of the solid electrolyte and particles of the active material may be increased to a sufficient degree.

In this embodiment, the sulfide solid electrolyte may be a sulfide glass-ceramic that includes $Li_2S$ and $P_2S_5$. The molar ratio of $Li_2S$ to $P_2S_5$ may be, for example, $Li_2S$:$P_2S_5$=70:30 to 80:20 or 75:25 to 80:20. When the ratio of $Li_2S$ to $P_2S_5$ is adjusted adequately, a sulfide solid electrolyte having a crystal structure with a high ionic conductivity may be produced while the lithium concentration, which affects the properties of a battery, is maintained at a certain level.

Examples of the oxide solid electrolyte include LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, and $Li_{1.5}Al_{0.5}Ge_{1.5}(PO_4)_3$.

The ratio of the solid electrolyte 32 to the positive electrode active material 16 included in the positive electrode mixture layer 14 is, for example, [Solid electrolyte]: [Positive electrode active material]=50:50 to 5:95 by mass and may be 30:70 to 10:90 by mass. When the ratio of the solid electrolyte 32 to the positive electrode active material 16 is adjusted adequately, the positive electrode mixture layer 14 may have a suitable lithium ion conductivity and a suitable electron conductivity.

The average diameter of particles of the solid electrolyte 32 is not limited and is, for example, 0.1 to 20 μm.

(c) Carbon-Containing Material

The carbon-containing material 18 is included in the battery 100 for one or a plurality of purposes; the carbon-containing material 18 serves, for example, as additives such as a binder, a dispersant, a thickener, and a leveling agent. As a binder, the carbon-containing material 18 increases the adhesion between particles of the materials constituting the battery 100, the adhesion between the layers constituting the battery 100, and the adhesion between the layers and current collectors. As a dispersant, the carbon-containing material 18 increases the dispersibility of particles of the materials included in slurries used for forming the layers. As a thickener, the carbon-containing material 18 imparts an adequate viscosity to the slurries used for forming the layers. As a leveling agent, the carbon-containing material 18 enhances the flatness of the surfaces of coating films formed by the application of the slurries.

It is necessary that the carbon-containing material 18 be unreactive to the active material and the solid electrolyte. The carbon-containing material 18 is selected in accordance with the properties of the surfaces of particles of the active material and the solid electrolyte. Examples of the carbon-containing material 18 include a thermoplastic resin, a thermosetting resin, carboxymethyl cellulose (CMC), ethyl cellulose, and a cellulose nanofiber derivative. Examples of the thermoplastic resin include styrene-butadiene-styrene (SBS), a styrene-ethylene-propylene copolymer (SEPS), a styrene-isoprene copolymer (SIS), a styrene-ethylene-butadiene-styrene (SEBS) resin, a styrene-butadiene rubber (SBR), an olefin resin, PVDF, and PVDF-HFP. Examples of the thermosetting resin include an epoxy resin, a phenol resin, a melamine resin, and a polyester. The above materials may be used alone or in a mixture of two or more as a carbon-containing material 18.

The ratio of the mass of the carbon-containing material 18 to the total mass of the positive electrode active material 16 and the solid electrolyte 32 is, for example, 0.01% or more and 5% or less. When the content of the carbon-containing material 18 is adjusted adequately, the particles may be dispersed to a sufficient degree by using the carbon-containing material 18. Furthermore, a sufficiently high adhesion may be achieved. In addition, the degradation in the properties, such as charge-discharge efficiency, of the battery 100 may be limited. The ratio of the mass of the carbon-containing material 18 to the total mass of the positive electrode active material 16 and the solid electrolyte 32 may be 0.1% or more and 3% or less or 0.1% or more and 1% or less.

The positive electrode mixture layer 14 may further include a conductive additive, such as acetylene black, Ketjenblack, carbon nanotubes, or carbon nanofibers.

3. Negative Electrode Mixture Layer (Electrode Mixture Layer)

The negative electrode mixture layer 24 includes a negative electrode active material 26, a carbon-containing material 18, and a solid electrolyte 32. The negative electrode active material 26 and the solid electrolyte 32 are particulate. A particle of the negative electrode active material 26 and a particle of the solid electrolyte 32 are bonded to each other with the carbon-containing material 18. Although not illustrated in FIG. 1, the carbon-containing material 18 also forms a bond between particles of the negative electrode active material 26 and the negative electrode current collector 22, a bond between particles of the solid electrolyte 32 and the negative electrode current collector 22, a bond between particles of the negative electrode active material 26, and a bond between particles of the solid electrolyte 32. In other words, in the negative electrode 20, the carbon-containing material 18 may be present between particles of the negative electrode active material 26 and the negative electrode current collector 22, between particles of the solid electrolyte 32 and the negative electrode current collector 22, between particles of the negative electrode active material 26, and between particles of the solid electrolyte 32.

Also in the negative electrode mixture layer 24, the carbon-containing material 18 serves, for example, as a binder. Specifically, the carbon-containing material 18 may reduce the degradation of the negative electrode 20 caused as a result of contraction or expansion of particles of the negative electrode active material 26. In the negative electrode mixture layer 24, the carbon-containing material 18 may form at least one bond selected from a bond between particles of the negative electrode active material 26 and the negative electrode current collector 22, a bond between particles of the solid electrolyte 32 and the negative electrode current collector 22, a bond between particles of the negative electrode active material 26, and a bond between particles of the solid electrolyte 32.

Examples of the negative electrode active material 26 include lithium, a metal capable of readily alloying with lithium, a carbon material, $Li_4Ti_5O_{12}$, and $SiO_x$ (x<2). Examples of the metal capable of readily alloying with lithium include indium, tin, and silicon. Examples of the carbon material include non-graphitizable carbon (i.e., hard carbon) and graphite. The negative electrode active material 26 is not necessarily particulate; the negative electrode mixture layer 24 may include a negative electrode active material having another shape, such as a foil-like shape or a mesh-like shape.

The average diameter of particles of the negative electrode active material 26 is not limited and may be, for example, 2 to 40 μm.

The above-described materials that can be used as a carbon-containing material 18 included in the positive electrode mixture layer 14 may be used also as a carbon-containing material 18 included in the negative electrode mixture layer 24. The above-described materials that can be used as a solid electrolyte 32 included in the positive electrode mixture layer 14 may be used also as a solid electrolyte 32 included in the negative electrode mixture layer 24. The carbon-containing material included in the positive electrode mixture layer 14 and the carbon-containing material included in the negative electrode mixture layer 24 may have different compositions. The solid electrolyte included in the positive electrode mixture layer 14 and the solid electrolyte included in the negative electrode mixture layer 24 may have different compositions. The negative electrode mixture layer 24 does not necessarily include a carbon-containing material. The negative electrode mixture layer 24 does not necessarily include a solid electrolyte.

The ratio of the solid electrolyte 32 to the negative electrode active material 26 included in the negative electrode mixture layer 24 is, for example, [Solid electrolyte]:[Negative electrode active material]=5:95 to 60:40 by mass and may be 30:70 to 50:50 by mass. When the ratio of the solid electrolyte 32 to the negative electrode active material 26 is adjusted adequately, the negative electrode mixture layer 24 may have a suitable lithium ion conductivity and a suitable electron conductivity.

The ratio of the mass of the carbon-containing material 18 to the total mass of the negative electrode active material 26 and the solid electrolyte 32 is, for example, 0.01% or more and 10% or less. When the content of the carbon-containing material 18 is adjusted adequately, the particles may be dispersed to a sufficient degree by using the carbon-containing material 18. Furthermore, a sufficiently high adhesion may be achieved. In addition, the degradation in the properties, such as charge-discharge efficiency, of the battery 100 may be limited. The ratio of the mass of the carbon-containing material 18 to the total mass of the negative electrode active material 26 and the solid electrolyte 32 may be 0.1% or more and 6% or less or 0.1% or more and 2% or less.

The negative electrode mixture layer 24 may further include a conductive additive, such as acetylene black, Ketjenblack, carbon nanotubes, or carbon nanofibers.

4. Electrolyte Layer

The electrolyte layer 30 provides electrical insulation between the positive electrode 10 and the negative electrode 20. The electrolyte layer 30 is composed of a material having ionic conductivity; in the case where the battery 100 is a lithium ion battery, the electrolyte layer 30 has lithium ion conductivity.

In this embodiment, the electrolyte layer 30 includes a carbon-containing material 18 and a solid electrolyte 32. The solid electrolyte 32 is particulate. Particles of the solid electrolyte 32 are bonded to one another with the carbon-containing material 18. In other words, in the electrolyte layer 30, the carbon-containing material 18 may be present between particles of the solid electrolyte 32.

The above-described materials that can be used as a carbon-containing material 18 included in the positive electrode mixture layer 14 may be used also as a carbon-containing material 18 included in the electrolyte layer 30. The above-described materials that can be used as a solid electrolyte 32 included in the positive electrode mixture layer 14 may be used also as a solid electrolyte 32 included in the electrolyte layer 30. The carbon-containing material included in the positive electrode mixture layer 14 and the carbon-containing material included in the electrolyte layer 30 may have different compositions. The solid electrolyte included in the positive electrode mixture layer 14 and the solid electrolyte included in the electrolyte layer 30 may have different compositions. The electrolyte layer 30 does not necessarily include a carbon-containing material.

The ratio of the mass of the carbon-containing material 18 to the mass of the solid electrolyte 32 is, for example, 0.01% or more and 10% or less. When the content of the carbon-containing material 18 is adjusted adequately, the particles may be dispersed to a sufficient degree by using the carbon-containing material 18. Furthermore, a sufficiently high adhesion may be achieved. In addition, the degradation in the properties, such as charge-discharge efficiency, of the battery 100 may be limited. The ratio of the mass of the carbon-containing material 18 to the mass of the solid electrolyte 32 may be 0.1% or more and 6% or less or 0.1% or more and 2% or less.

5. Analysis of Positive Electrode Mixture Layer by Auger Electron Spectroscopy

In a spectrum (i.e., Auger electron spectrum) obtained by analyzing the positive electrode mixture layer 14 by Auger electron spectroscopy, the intensity of a peak corresponding to carbon included in the carbon-containing material 18 is defined as peak intensity C, and the intensity of a peak corresponding to sulfur included in the solid electrolyte 32 is defined as peak intensity S. The peak intensity C is, specifically, the intensity of a peak corresponding to carbon included in the carbon-containing material 18 that is present on the surface of a particle of the solid electrolyte 32. The solid electrolyte 32 is a sulfide solid electrolyte. In this embodiment, the intensity ratio C/S satisfies $0.2 \leq C/S \leq 1$. The peak intensities C and S are determined using a differential spectrum. The peak intensities may be the peak-to-peak values (i.e., differential intensities) determined from the differential spectrum.

In the positive electrode mixture layer 14, the carbon-containing material 18 covers only parts of the surfaces of some of the particles of the positive electrode active material 16. Similarly, the carbon-containing material 18 covers only parts of the surfaces of some of the particles of the solid electrolyte 32. Therefore, the paths through which electrons and ions migrate can be retained. Now, attention is focused on the specific particles of the solid electrolyte 32. The surfaces of the particles of the solid electrolyte 32 include a part covered with the carbon-containing material 18 and a part that is not covered with the carbon-containing material 18. The entire surfaces of some of the particles of the positive electrode active material 16 may be covered with a thin film composed of the carbon-containing material 18. The entire surfaces of some of the particle of the solid electrolyte 32 may be covered with a thin film composed of the carbon-containing material 18. It is difficult to directly measure the distribution of the carbon-containing material 18 because the thickness of the thin film composed of the carbon-containing material 18 is, for example, on the order of nanometers. Although the carbon-containing material 18 is present only in the vicinity of the contact point between particles in FIG. 1, it is considered that the carbon-containing material 18 is widely distributed over the entire surfaces of the particles in reality.

When a specimen is analyzed by Auger electron spectroscopy, an electron beam is impinged on the specimen, from which an Auger electron is generated. Since Auger electrons have a significantly short mean free path, only the Auger electrons generated from atoms located in the vicinity of the surface of the specimen can be emitted from the specimen without losing energy and detected. The intensity ratio C/S reflects the content of the carbon-containing material 18 present on the surfaces of particles of the sulfide solid electrolyte 32. When the intensity ratio C/S satisfies $0.2 \leq C/S \leq 1$, a battery having a markedly high charge-discharge efficiency may be produced.

It is considered that, when the intensity ratio C/S is 0.2 or more, an appropriate amount of carbon-containing material 18 is present on the surfaces of particles of the solid electrolyte 32. In such a case, the aggregation of particles of the solid electrolyte 32 may be reduced and, accordingly, the dispersibility of particles of the positive electrode active material 16 may be enhanced. Furthermore, since the carbon-containing material 18 is deposited on the surfaces of particles of the solid electrolyte 32, the likelihood of an excessive amount of carbon-containing material 18 being deposited on the surfaces of particles of the positive electrode active material 16 may be reduced and, consequently, the degradation in the electron conductivity of the positive electrode mixture layer 14 may be limited. As a result, the properties of the battery 100 may be enhanced.

It is considered that, when the intensity ratio C/S is 1 or less, an excessive amount of carbon-containing material 18 is not deposited on the surfaces of particles of the solid electrolyte 32. In such a case, the ionic conductivity between particles of the solid electrolyte 32 may be enhanced. A high ionic conductivity of the positive electrode mixture layer 14 may result in enhancement in the properties of the battery 100. The intensity ratio C/S may satisfy $0.208 \leq C/S \leq 0.457$. In such a case, a battery having a further high charge-discharge efficiency may be produced.

The intensity ratio C/S varies among particles. It is considered that the properties of the battery 100 are affected not by the C/S values of individual particles but by the average C/S value of a plurality of particles. Therefore, the C/S value in the formula $0.2 \leq C/S \leq 1$ may be the average of the C/S values of a plurality of particles (e.g., 2 to 10 particles).

The above description applies also to the negative electrode mixture layer 24.

A method for producing a battery 100 is described below.

A positive electrode 10, a negative electrode 20, and an electrolyte layer 30 are prepared by the following method.

Figure 2:
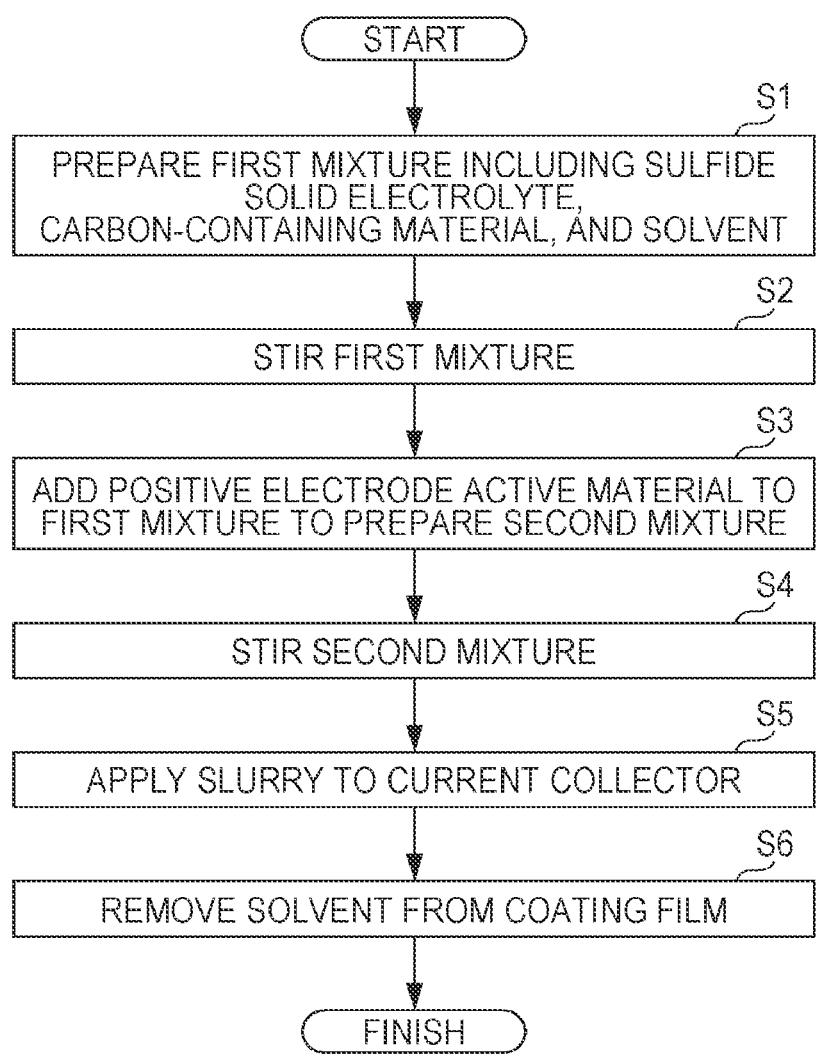
FIG. 2 is a flowchart illustrating an example of a method for producing an electrode mixture.

For preparing the positive electrode 10, a positive electrode slurry that includes a positive electrode active material 16, a solid electrolyte 32, a carbon-containing material 18, and a solvent is prepared in accordance with the flowchart illustrated in FIG. 2. In Step S1, a first mixture that includes the solid electrolyte 32, the carbon-containing material 18, and a solvent is prepared. In Step S2, the first mixture is stirred by a predetermined method. In Step S3, a powder of the positive electrode active material 16 is added to the first mixture to prepare a second mixture. A solvent may be further added to the second mixture as needed. In Step S4, the second mixture is stirred. Hereby, the positive electrode slurry is prepared. In Step S5, the positive electrode slurry is applied to a positive electrode current collector 12 by blade coating or the like to form a coating film. In Step S6, the coating film is dried. Hereby, a positive electrode 10 that includes a positive electrode mixture layer 14 is prepared.

It is necessary that the solvent and the carbon-containing material 18 be unreactive to the positive electrode active material 16 and the solid electrolyte 32. For preparing the positive electrode slurry, it is necessary to uniformly disperse the positive electrode active material 16 and the solid electrolyte 32 in the solvent. The density of the positive electrode active material 16 and the properties of the surfaces of particles of the positive electrode active material 16 are different from those of the solid electrolyte 32. The surfaces of particles of the positive electrode active material 16 may be coated with an oxide. Therefore, it is difficult to simultaneously disperse the positive electrode active material 16 and the solid electrolyte 32 in the solvent. In addition, the carbon-containing material 18 is more likely to adhere to particles of the positive electrode active material 16 than to particles of the solid electrolyte 32. An increase in the amount of carbon-containing material 18 deposited on the surfaces of particles of the positive electrode active material 16 may result in a reduction in the electron conductivity of the positive electrode active material 16.

In the production method according to this embodiment, a first mixture that includes a solid electrolyte 32, a carbon-containing material 18, and a solvent is prepared, the first mixture is stirred, and a positive electrode active material 16 is subsequently added to the first mixture to prepare a second mixture. In other words, the solid electrolyte 32, which is likely to form aggregates, is dispersed in a solvent first, and the positive electrode active material 16 is subsequently dispersed in the solvent. This method enables the solid electrolyte 32 to be dispersed in the solvent with certainty and increases the adhesion between particles of the materials to a sufficient degree. Consequently, a battery having suitable properties may be produced.

The method by which the first mixture is stirred and the method by which the second mixture is stirred are not limited. The method by which the first mixture is stirred may be the same or different from the method by which the second mixture is stirred. For stirring the first and second mixtures, a mixing device such as a ball mill, a rotary mixer, a double-arm mixer, or a kneader may be used. The first and second mixtures may be stirred using ultrasound. For example, in Step S2, ultrasound may be applied to the first mixture with an ultrasonic homogenizer. In such a case, the solid electrolyte 32 may be dispersed in the solvent with certainty.

The amount of time during which the first mixture is stirred and the amount of time during which the second mixture is stirred are not limited. The amount of time during which the first mixture is stirred may be equal to or different from the amount of time during which the second mixture is stirred. The amount of time during which the first mixture is stirred is, for example, 0.5 to 120 minutes. The amount of time during which the second mixture is stirred is, for example, 0.5 to 120 minutes.

The type of the solvent is not limited. For example, it is necessary that the solvent have the following properties: the solvent is unreactive to the solid electrolyte 32 and the active material; the solvent has a low polarity; the carbon-containing material 18 is soluble in the solvent; the solvent increases ease of application of the slurry; and the solvent has a boiling point such that the solvent can be readily removed by drying. Specific examples of such a solvent include 1,2,3,4-tetrahydronaphthalene (tetralin), anisole, xylene, octane, hexane, decalin, butyl acetate, ethyl propionate, and tripropylamine. It is recommendable to use a nonpolar solvent, such as tetralin. The first mixture may be prepared by dissolving the carbon-containing material 18 in the above solvent and adding the solid electrolyte 32 to the resulting solution.

A negative electrode 20 may be prepared as in the preparation of the positive electrode 10, except that the positive electrode active material 16 is changed to the negative electrode active material 26.

The electrolyte layer 30 may be prepared as in the preparation of the positive electrode 10, except that the positive electrode active material 16 is not used. The electrolyte layer 30 may be formed directly on the positive electrode mixture layer 14 or the negative electrode mixture layer 24. Alternatively, the electrolyte layer 30 may be formed on a support, such as a resin film.

The positive electrode 10, the electrolyte layer 30, and the negative electrode 20 are stacked on top of one another to form a multilayer body such that the electrolyte layer 30 is interposed between the positive electrode mixture layer 14 and the negative electrode mixture layer 24. The multilayer body is press-molded such that the positive electrode 10, the electrolyte layer 30, and the negative electrode 20 come into intimate contact with one another. Hereby, a battery 100 is produced. After a terminal has been attached to the positive electrode 10 and the negative electrode 20, the battery 100 may be put into a casing. Examples of the material for the casing of the battery 100 include aluminum foil laminated with a resin film; a metal, such as aluminum, stainless steel, or iron; and a resin.

In the present disclosure, it is not necessary that all of the positive electrode 10, the negative electrode 20, and the electrolyte layer 30 include the carbon-containing material 18. The intended advantageous effects may be achieved when at least one component selected from the positive electrode 10, the negative electrode 20, and the electrolyte layer 30 includes the carbon-containing material 18.

The battery 100 is not limited to be an all-solid-state battery. The intended advantageous effects may be achieved as long as the positive electrode 10 and/or the negative electrode 20 includes the carbon-containing material 18 even when the battery 100 includes an electrolyte solution instead of a solid electrolyte.

It is not necessary that particles of all the materials constituting the positive electrode 10 be bonded to one another with the carbon-containing material 18. The carbon-containing material 18 may form at least one bond selected from a bond between particles of the positive electrode active material 16 and particles of the solid electrolyte 32, a bond between particles of the positive electrode active material 16 and the positive electrode current collector 12, a bond between particles of the solid electrolyte 32 and the positive electrode current collector 12, a bond between particles of the positive electrode active material 16, and a bond between particles of the solid electrolyte 32. It is not necessary that particles of all the materials constituting the negative electrode 20 be bonded to one another with the carbon-containing material 18. The carbon-containing material 18 may form at least one bond selected from a bond between particles of the negative electrode active material 26 and particles of the solid electrolyte 32, a bond between particles of the negative electrode active material 26 and the negative electrode current collector 22, a bond between particles of the solid electrolyte 32 and the negative electrode current collector 22, a bond between particles of the negative electrode active material 26, and a bond between particles of the solid electrolyte 32.

In the negative electrode mixture layer 24, the entire surfaces of some of the particles of the negative electrode active material 26 may be covered with a thin film composed of the carbon-containing material 18, and the entire surfaces of some of the particles of the solid electrolyte 32 may be covered with a thin film composed of the carbon-containing material 18. In the electrolyte layer 30, the entire surfaces of some of the particles of the solid electrolyte 32 may be covered with a thin film composed of the carbon-containing material 18. Although the carbon-containing material 18 is present only in the vicinity of the contact point between particles in FIG. 1, it is considered that the carbon-containing material 18 is widely distributed over the entire surfaces of the particles in reality.

EXAMPLES

Examples of the present disclosure are described below. The following examples are merely illustrative and not intended to limit the scope of the present disclosure. The steps described below were conducted in a glove box or a dry room. The dew point in the glove box and the dew point in the dry room were set to −45° C. or less.

Sample 1

1. Preparation of Positive Electrode

A power of NCA ($LiNi_{0.8}Co_{0.15}Al_{0.05}O_2$, median particle diameter: 5 μm) was prepared as a positive electrode active material. A $LiNbO_3$ coating layer was formed on the surfaces of particles of the positive electrode active material with a tumbling fluidized bed coating machine. The target thickness of the coating layer was 8 nm.

A $Li_2S$ powder and a $P_2S_5$ powder were mixed with each other at a molar ratio of 75:25. The resulting powder mixture was subjected to mechanical milling to produce a powder (median particle diameter: 10 μm) of a sulfide solid electrolyte having a composition of $Li_2S$—$P_2S_5$ ($Li_2S:P_2S_5=75:25$). The powder of the sulfide solid electrolyte was annealed at 270° C. for 2 hours.

As a carbon-containing material, a 5 mass % solution of a maleic anhydride-modified hydrogenated styrene-ethylene-butylene elastomer (maleic anhydride-modified SEBS, "Tuftec M1913" produced by Asahi Kasei Corporation) was prepared. As a solvent, 1,2,3,4-tetrahydronaphthalene (tetralin) was used.

With 0.6 g of the sulfide solid electrolyte, 0.2 g of the solution of the carbon-containing material and the solvent (i.e., tetralin) were mixed to prepare a first mixture. The amount of the solvent used was adjusted such that the proportion of the solid component in the first mixture was 55% by mass.

The first mixture was subjected to an ultrasonic homogenizer "UH-50" produced by SMT Co., Ltd. for 8 minutes. Subsequently, 1.4 g of the positive electrode active material was added to the first mixture to prepare a second mixture. The second mixture was stirred with a planetary mixer "ARE-310" produced by THINKY CORPORATION at a rotation speed of 1600 rpm for 3 minutes to form a positive electrode slurry used for forming a positive electrode mixture layer. A planetary mixer is a type of rotary mixer.

The positive electrode slurry was applied to a 15-mm square portion of a positive electrode current collector to form a coating film. The positive electrode current collector used was composed of copper foil having a thickness of 12 μm. Subsequently, vacuum drying was performed at 100° C. for 60 minutes in order to remove the solvent from the coating film. Hereby, a positive electrode mixture layer was formed on the positive electrode current collector. In this stage, the positive electrode mixture layer had a thickness of about 50 μm. Through the above steps, a positive electrode including a positive electrode current collector and a positive electrode mixture layer was prepared.

2. Preparation of Solid Electrolyte Layer

With 1.2 g of a sulfide solid electrolyte, a solution of a carbon-containing material was mixed to prepare a mixture. The sulfide solid electrolyte used and the solution of a carbon-containing material used were the same as those used in the preparation of the positive electrode. The amount of carbon-containing material included in the mixture was 1% by mass of the amount (1.2 g) of the solid electrolyte used. The mixture was stirred with a planetary mixer at a rotation speed of 1600 rpm for 3 minutes to form an electrolyte slurry used for forming a solid electrolyte layer.

The electrolyte slurry was applied to a 20-mm square portion of the positive electrode mixture layer to form a coating film. Subsequently, vacuum drying was performed at 100° C. for 60 minutes in order to remove the solvent from the coating film. Hereby, a solid electrolyte layer was formed on the positive electrode mixture layer. In this stage, the solid electrolyte layer had a thickness of about 150 μm.

3. Negative Electrode

A sheet of metal indium foil was used as a negative electrode.

4. Preparation of All-Solid-State Battery

The solid electrolyte layer was pressed at a surface pressure of 950 MPa for 5 minutes. Subsequently, the positive and negative electrodes were superimposed on each other to form a multilayer body such that the solid electrolyte layer came into contact with the negative electrode. The positive and negative electrodes were pressed against each other at a surface pressure of 100 MPa for 10 seconds. After a terminal had been attached to the positive and negative electrodes, the multilayer body was put into a container made of an aluminium laminated film at a reduced pressure. Hereby, an all-solid-state battery of Sample 1 was prepared.

Sample 2

An all-solid-state battery of Sample 2 was prepared as in Sample 1, except that the temperature at which the coating film was dried in the formation of the positive electrode mixture layer was set to 80° C.

Sample 3

An all-solid-state battery of Sample 3 was prepared as in Sample 1, except that the temperature at which the coating film was dried in the formation of the positive electrode mixture layer was set to 120° C.

Sample 4

An all-solid-state battery of Sample 4 was prepared as in Sample 1, except that the amount of time (i.e., treatment time) during which the second mixture was stirred was set to 6 minutes.

Sample 5

An all-solid-state battery of Sample 5 was prepared as in Sample 1, except that the second mixture was stirred with an ultrasonic homogenizer and the amount of time during which the second mixture was stirred was set to 4 minutes.

Sample 6

An all-solid-state battery of Sample 6 was prepared as in Sample 1, except that the second mixture was stirred with an ultrasonic homogenizer and the amount of time during which the second mixture was stirred was set to 16 minutes.

Sample 7

An all-solid-state battery of Sample 7 was prepared as in Sample 5, except that a maleic anhydride-modified rosin resin "MALKYD No. 1" produced by Arakawa Chemical Industries, Ltd. was used as a carbon-containing material included in the positive electrode mixture layer.

Sample 8

An all-solid-state battery of Sample 8 was prepared as in Sample 5, except that PVDF-HFP "Ultra Flex B" produced by Arkema was used as a carbon-containing material included in the positive electrode mixture layer and ethyl 3-ethoxypropionate was used as a solvent.

Sample 9

An all-solid-state battery of Sample 9 was prepared as in Sample 1, except that the first mixture was not stirred and the amount of time during which the second mixture was stirred was set to 11 minutes.

Sample 10

An all-solid-state battery of Sample 10 was prepared as in Sample 1, except that the first mixture was stirred with a planetary mixer at a rotation speed of 1600 rpm for 8 minutes.

Sample 11

An all-solid-state battery of Sample 11 was prepared as in Sample 1, except that the first mixture was stirred with a planetary mixer at a rotation speed of 1600 rpm for 8 minutes and the second mixture was stirred with an ultrasonic homogenizer for 4 minutes.

Charge/Discharge Cycle Testing

Each of the all-solid-state batteries prepared in Samples 1 to 11 was subjected to charge/discharge cycle testing to determine the charge-discharge efficiency of the battery. Charge of the batteries was performed with a final voltage of 3.7 V at 0.05 C and 25° C. Discharge of the batteries was performed with a final voltage of 1.9 V at 0.05 C and 25° C. The testing was initiated with charge of the batteries. The ratio (%) of the discharge capacity of each of the batteries to the charge capacity of the battery was calculated as the charge-discharge efficiency of the battery.

Analysis of Positive Electrode Mixture Layer by Auger Electron Spectroscopy

Figure 3:
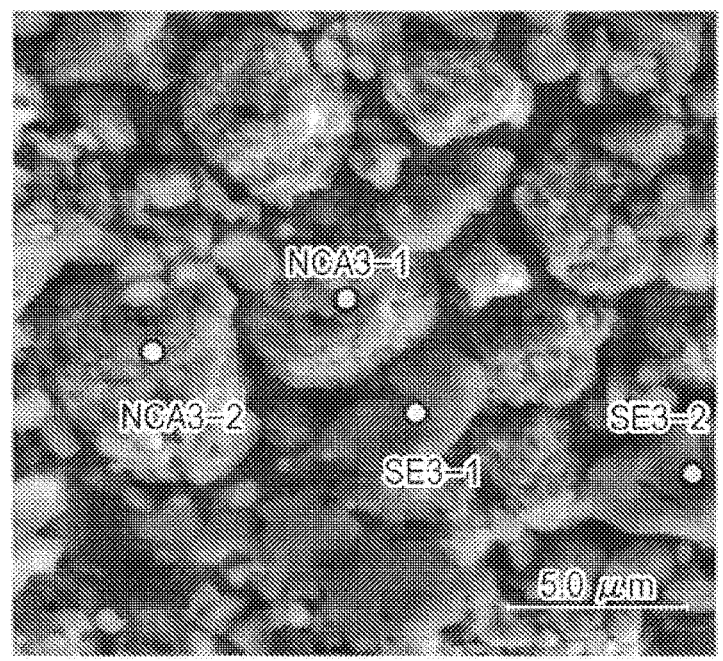
FIG. 3 is an SEM image of a positive electrode mixture layer included in a battery prepared in Sample 10.
Figure 4A:
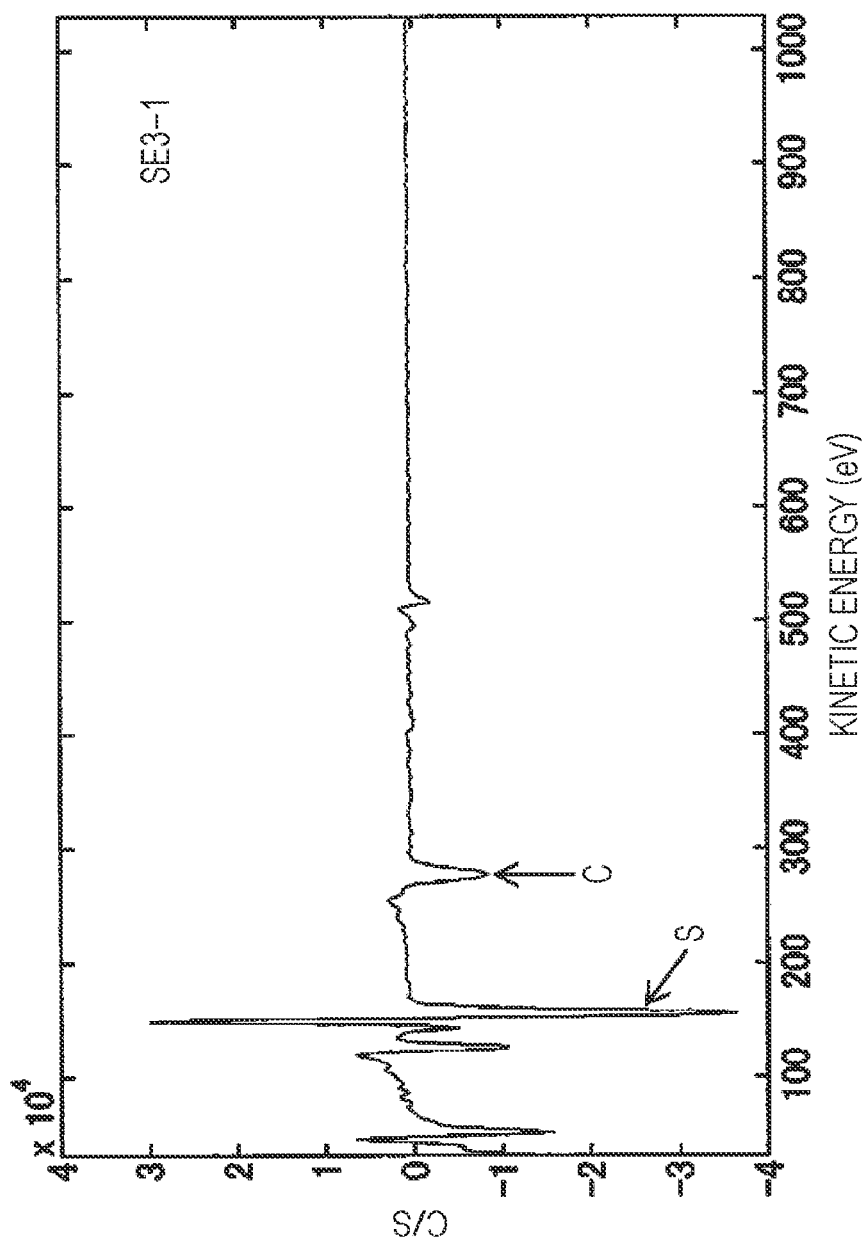
FIG. 4A is an Auger electron spectrum measured at the point SE3-1 shown in FIG. 3.
Figure 5:
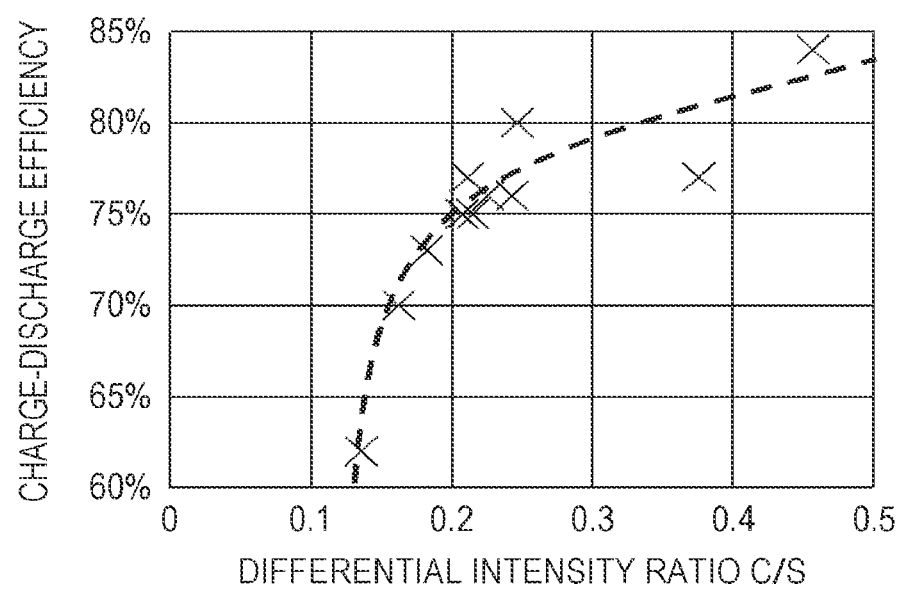
FIG. 5 is a graph illustrating the relationship between the peak intensity ratio C/S and the charge-discharge efficiency.

After the charge/discharge cycle testing had been terminated, the batteries prepared in Samples 1 to 11 were decomposed and the positive electrodes were detached from the respective batteries. Specifically, the solid electrolyte layers were separated from the positive electrode mixture layers. Each of the positive electrode mixture layers was analyzed with an Auger electron spectroscopy system "PH1-4800" produced by ULVAC-PHI, Inc. An electron beam (accelerating voltage: 10 kV (10 nA), inclination angle: 15 deg) was impinged onto particles of the solid electrolyte. The intensity ratio C/S of the carbon peak intensity C to the sulfur peak intensity S was calculated. In Samples 1 to 8 and 11, the average of the intensity ratios C/S determined from spectra obtained at randomly selected 10 points (i.e., 10 particles) was calculated. In Samples 9 and 10, the average of the intensity ratios C/S determined from spectra obtained at randomly selected 2 points (i.e., 2 particles) was calculated. Table 1 summarizes the results. FIG. 3 is an image of the positive electrode mixture layer included in the battery prepared in Sample 10 which was taken with an electron scanning microscope. FIG. 3 shows the two measurement points SE3-1 and SE3-2 at which an electron beam was impinged. FIG. 4A is an Auger electron spectrum, which is a differential spectrum, obtained at the measurement point SE3-1. FIG. 4B is an Auger electron spectrum, which is a differential spectrum, obtained at the measurement point SE3-2. The peak-to-peak values in the differential spectrum, that is, differential intensities, were considered to be the peak intensity C and the peak intensity S, which were used for calculating the intensity ratio C/S (specifically, differential intensity ratio). FIG. 5 is a graph illustrating the relationship between the charge-discharge efficiency and the intensity ratio C/S.

When a positive electrode mixture layer is analyzed by Auger electron spectroscopy, attention needs to be paid to the following items. It is advantageous to reduce the distance between the point at which the electron beam is impinged on a particle of the solid electrolyte and the center of the particle of the solid electrolyte to a minimum. This reduces the likelihood of Auger electrons being blocked by surrounding particles while the Auger electrons travel from the measurement point toward the detector. It is also advantageous to use an electron beam having a spot size smaller than the height of the surface roughness (i.e., surface irregularities) of the particle. This minimizes the negative impact caused by the surface roughness of the particle.

TABLE 1

| | Carbon-containing material of positive electrode mixture layer | Stirring method 1, treatment time | Stirring method 2, treatment time | Drying temperature of positive electrode mixture layer | Charge-discharge efficiency | Intensity ratio C/S |
|---|---|---|---|---|---|---|
| Sample 1 | Acid-modified SEBS | Ultrasound, 8 min | Planetary, 3 min | 100° C. | 76% | 0.226 |
| Sample 2 | Acid-modified SEBS | Ultrasound, 8 min | Planetary, 3 min | 80° C. | 75% | 0.215 |
| Sample 3 | Acid-modified SEBS | Ultrasound, 8 min | Planetary, 3 min | 120° C. | 75% | 0.208 |
| Sample 4 | Acid-modified SEBS | Ultrasound, 8 min | Planetary, 6 min | 100° C. | 77% | 0.376 |
| Sample 5 | Acid-modified SEBS | Ultrasound, 8 min | Ultrasound, 4 min | 100° C. | 84% | 0.457 |
| Sample 6 | Acid-modified SEBS | Ultrasound, 8 min | Ultrasound, 16 min | 100° C. | 80% | 0.247 |
| Sample 7 | Acid-modified rosin | Ultrasound, 8 min | Ultrasound, 4 min | 100° C. | 76% | 0.244 |
| Sample 8 | PVDF-HFP | Ultrasound, 8 min | Ultrasound, 4 min | 100° C. | 77% | 0.211 |
| Sample 9 | Acid-modified SEBS | None | Planetary, 11 min | 100° C. | 62% | 0.136 |
| Sample 10 | Acid-modified SEBS | Planetary, 8 min | Planetary, 3 min | 100° C. | 73% | 0.183 |
| Sample 11 | Acid-modified SEBS | Planetary, 8 min | Ultrasound, 4 min | 100° C. | 70% | 0.163 |

The results shown in Table 1 and FIG. 5 confirm a correlation between the charge-discharge efficiency and the intensity ratio C/S. The all-solid-state batteries prepared in Samples 1 to 8 had a charge-discharge efficiency of 75% or more. When the carbon-containing material is deposited on the surfaces of particles of the sulfide solid electrolyte, aggregation of particles of the sulfide solid electrolyte is reduced and, consequently, the dispersibility of particles of an active material included in the electrode mixture layer may be enhanced. Furthermore, when the carbon-containing material is deposited on the surfaces of particles of the sulfide solid electrolyte, the amount of carbon-containing material deposited on the surfaces of particles of the active material may be reduced. Consequently, electron conductivity may be enhanced. It is considered that the property (i.e., the charge-discharge efficiency) of each of the batteries was enhanced by the above mechanisms.

The increase in charge-discharge efficiency became smaller when the intensity ratio C/S was 0.2 or more. This is presumably because the ionic conductivity between particles of the sulfide solid electrolyte was reduced with an increase in the amount of carbon-containing material deposited on the surfaces of the particles of the sulfide solid electrolyte.

When the intensity ratio C/S was 1 or less, an excessively large amount of carbon-containing material was not deposited on the surfaces of particles of the sulfide solid electrolyte and, consequently, the ionic conductivity between the particles of the sulfide solid electrolyte was increased. It is considered that, as a result, the property (i.e., the charge-discharge efficiency) of each of the batteries was enhanced.

The all-solid-state battery according to the present disclosure is not limited by the description of the above embodiments and examples. Various modifications that may be conceived by those skilled in the art may be applied to the all-solid-state battery according to the embodiment and examples without departing from the scope of the present disclosure. Forms resulting from combinations of elements of the different embodiments and examples may be included within the scope of the present disclosure.

For example, in the present disclosure, it is not necessary that all of the positive electrode 10, the negative electrode 20, and the electrolyte layer 30 include the carbon-containing material 18. The intended advantageous effects may be achieved when at least one component selected from the positive electrode 10, the negative electrode 20, and the electrolyte layer 30 includes the carbon-containing material 18.

The technology disclosed in the present disclosure may be suitably applied to batteries included in personal digital assistants, portable electronic equipment, home power storage systems, two-wheeled motor vehicles, electric vehicles, hybrid electric vehicles, and the like.

What is claimed is:
1. A method for producing an electrode, the method comprising:
preparing a slurry including a sulfide solid electrolyte, an electrode active material, a carbon-containing material, and a solvent, by
stirring a first mixture including the sulfide solid electrolyte, the carbon-containing material, and the solvent, using an ultrasound homogenizer,
adding the electrode active material to the first mixture to prepare a second mixture, and
stirring the second mixture;
applying the slurry to a current collector to form a coating film on the current collector; and
removing the solvent from the coating film to form an electrode mixture layer,
[wherein the slurry is prepared by stirring a first mixture including the sulfide solid electrolyte, the carbon-containing material, and the solvent, using an ultrasound homogenizer, adding the electrode active material to the first mixture to prepare a second mixture, and stirring the second mixture,] and
wherein an intensity ratio C/S determined from a spectrum obtained by analyzing the electrode mixture lay- ered by Auger electron spectroscopy satisfies $0.2 \leq C/S \leq 1$, where C is an intensity of a first peak in the spectrum, the first peak corresponding to carbon included in the carbon-containing material, and S is an intensity of a second peak in the spectrum, the second peak corresponding to sulfur including in the sulfide solid electrolyte.

2. The method for producing an electrode according to claim 1,
wherein the stirring the second mixture is performed by using a ball mill, a rotary mixer, a double-arm mixer, a kneader or an ultrasound homogenizer.

3. The method for producing an electrode according to claim 1,
a mass of the carbon-containing material is from 0.01% to 5% of a total mass of the electrode active material and the sulfide solid electrolyte.

4. The method for producing an electrode according to claim 1,
a thin film composed of the carbon-containing material covers at least a part of a surface of the sulfide solid electrolyte, a thickness of the thin film composed of the carbon-containing material is on the order of nanometers.

5. The method for producing an electrode according to claim 1, wherein the carbon-containing material includes one or more of a thermoplastic resin, a thermosetting resin, carboxymethyl cellulose, ethyl cellulose or a cellulose nanofiber derivative.

6. The method for producing an electrode according to claim 1, wherein the carbon-containing material includes an acid-modified styrene-ethylene-butadiene-styrene resin.

\* \* \* \* \*